May 5, 1925.
H. C. PRIEBE
RAILROAD CAR
Filed Dec. 19, 1923     2 Sheets-Sheet 1
1,536,136
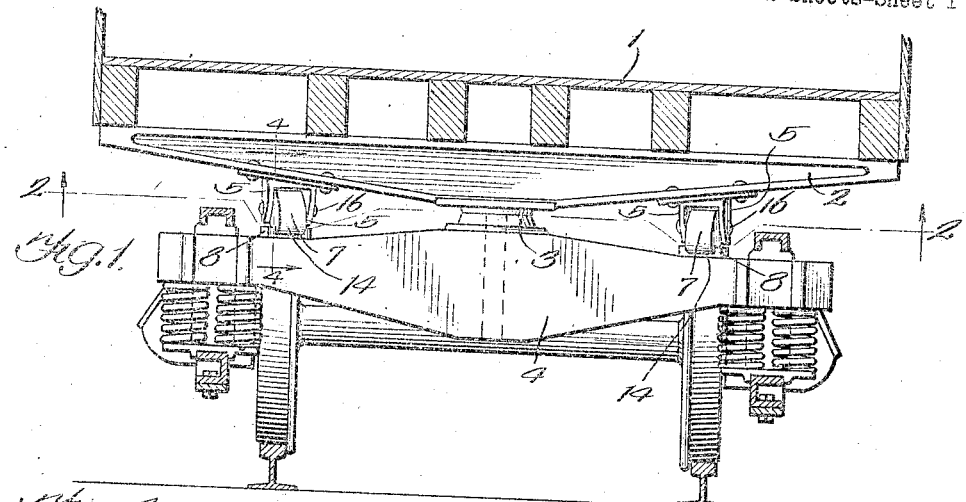
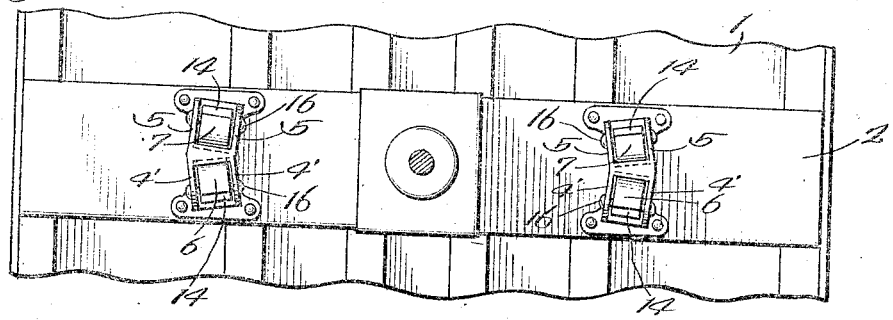
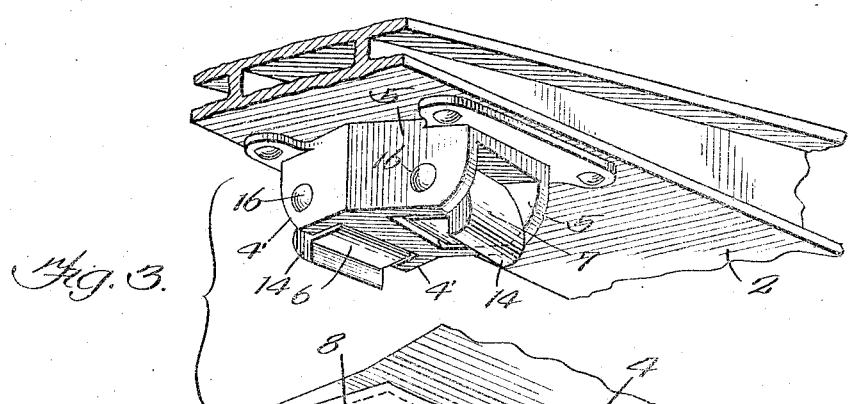
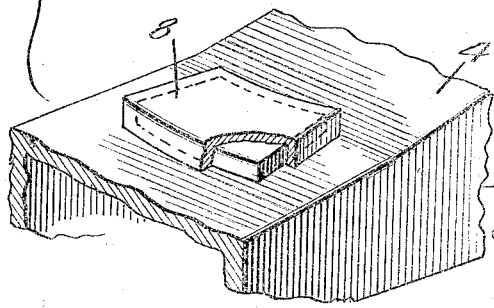
Inventor:
Herman C. Priebe

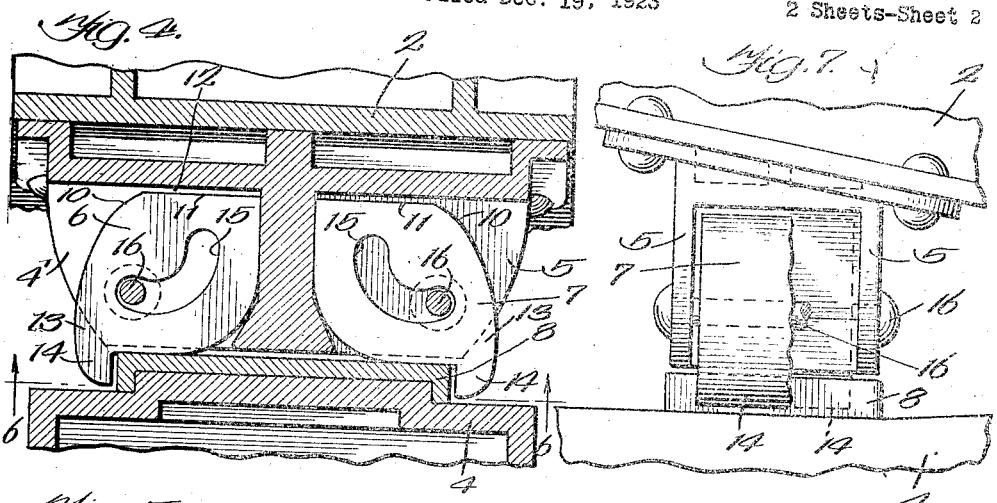
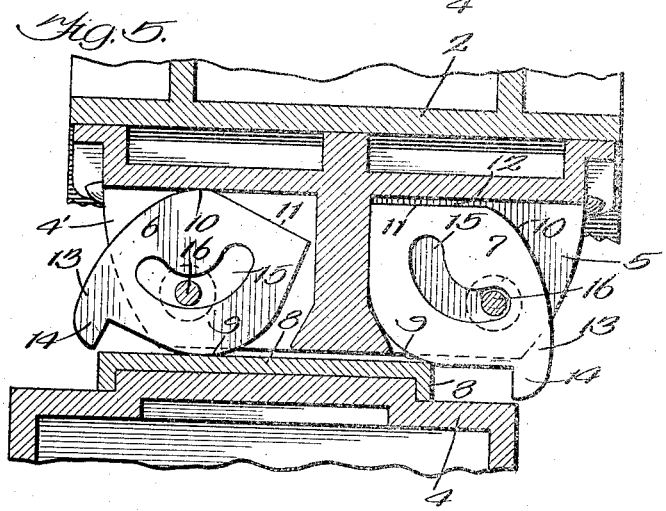
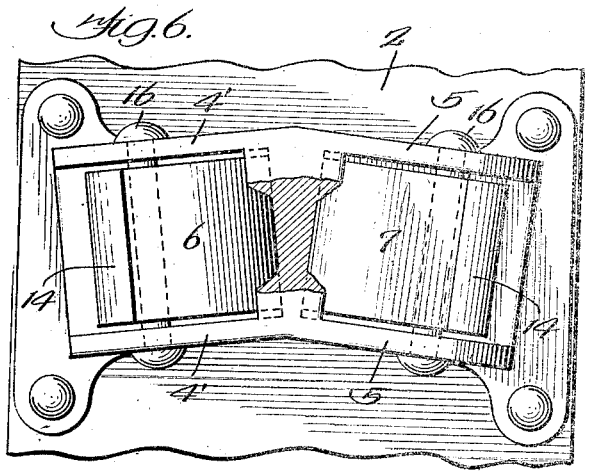
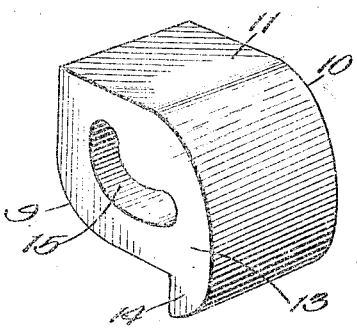

Patented May 5, 1925.

1,536,136

UNITED STATES PATENT OFFICE.

HERMAN C. PRIEBE, OF BLUE ISLAND, ILLINOIS.

RAILROAD CAR.

Application filed December 19, 1923. Serial No. 681,610.

*To all whom it may concern:*

Be it known that I, HERMAN C. PRIEBE, citizen of the United States, residing at Blue Island, in the county of Cook and State of Illinois, have invented a certain new and useful Improvement in Railroad Cars, of which the following is a full, clear, concise, and exact description.

My invention relates to railroad cars and has for its general object the provision of improved side bearings.

In accordance with my invention, the side bearings are mounted upon the body bolster to be normally out of supporting relation thereto, but so related thereto as to be adjustable by the truck bolster into the body bolster supporting position. These side bearings are desirably in the form of oscillating rollers which are self restoring to nonfunctioning position and which are provided with lugs engageable by the truck bolster in order that they may be brought into functioning position. Two such rollers are mounted in symmetrical relation upon each end of the body bolster, a portion upon the truck bolster being disposed between the lugs so that one roller or the other at each end of the body bolster, is alone brought into functioning position, according to the direction in which the truck and body bolsters are relatively turned. The rollers are desirably made self restoring by being counter-weighted in a manner to cause the rollers to return to normal as the truck bolster moves away from the lugs thereof.

The invention will be more fully explained by reference to the accompanying drawings in which Fig. 1 is a cross sectional view of a portion of a car body with the bolsters and a truck beneath the same, portions of the truck being shown in section; Fig. 2 is a sectional view on line 2—2 of Fig. 1; Fig. 3 is a perspective view showing end portions of the bolsters in separated relation; Fig. 4 is a sectional view on line 4—4 of Fig. 1; Fig. 5 is similar to Fig. 4 but showing changed positions; Fig. 6 is a view on line 6—6 of Fig. 4; Fig. 7 is an end view, with parts broken away; and Fig. 8 is a perspective view of one of the rollers.

Like parts are indicated by similar characters of reference throughout the different figures.

The portion 1 of a car body of one construction is illustrated, though it is understood that the invention is not to be limited to any particular form of car. Such car body is provided with two body bolsters, one near each end thereof, of which the drawings illustrate but one body bolster 2. Each body bolster is assembled by means of a center bearing 3 with the bolster 4 of a wheel truck. The body bolster may be furnished with downwardly projecting pairs of ears 4' 4'—5, 5 which are arranged upon chords of a circle whose center is in the axis of the center bearing. A roller 6 is interposed between each pair of ears 4' and another roller 7 is interposed between the ears 5 of each remaining pair. Each roller may bear at its bottom upon a liner 8 upon the top wall of the truck bolster. The rollers are formed with arcuate surfaces 9 where they engage the truck bolster and with arcuate surfaces 10 concentric with the arcuate surfaces 9 that are to be brought into supporting relation with the body bolster when the two bolsters are relatively turned upon the axis defined by the center bearing. Each roller is sufficiently flattened as indicated at 11 to be brought, at this portion thereof, so far within the circle of the curved surfaces 9 and 10 as to normally afford a gap 12 between such roller and the body bolster, a position which is to obtain when the two bolsters are in the same upright plane or parallel. The rollers are formed with extensions 13, these extensions sufficiently counter-weighting the rollers so that their upper portions will turn away from each other in their self restoring adjustment to their normal positions. Each roller extension 13 is formed with a lug 14 and each truck bolster has its liner 8 at each end interposed between the lugs 14 of the overlying pair of symmetrically arranged rollers. When the bolsters are in angular relation by being relatively turned out of their normal upright plane, one or the other of the lugs 14 at each side of the car is engaged by the adjacent bolster portion 8 according to the direction of the relative turning movement of the bolsters, whereby the rollers having such engaged lugs are turned to bring their arcuate portions 10 into supporting relation with the bottom of the body bolster whereby the body bolster is then also supported upon the ends of the truck bolster to prevent the car body from sagging when the car is rounding curves. The rollers are desirably formed with arcuate openings 15 therethrough which receive pins 16 that are carried by ears 4', 4'—5, 5. These pins serve to assure the maintenance of the assembly of the rollers with the body bolster.

Having thus described my invention I claim as new and desire to secure by Letters Patent the following:—

1. The combination with a car truck bolster; of a car body bolster; and oscillating rollers interposed between the bolsters and each formed to support the body bolster, when turned to one position and to be free of this supporting relation when turned to an alternative position and each having a lug engageable with the truck bolster to be turned thereby to functioning position when the bolsters are angular and each being self-restoring to non-functioning position when the bolsters are parallel.

2. The combination with a car truck bolster; of a car body bolster; and oscillating rollers interposed between the bolsters and each having a rounded portion supporting the body bolster, when turned to one position and a flattened portion to be free of this supporting relation when turned to an alternating position and each having a lug engageable with the truck bolster to be turned thereby to place its rounded portion uppermost when the bolsters are angular and each being self-restoring to place its flattened portion uppermost when the bolsters are parallel.

3. The combination with a car truck bolster; of a car body bolster; and oscillating rollers interposed between the bolsters and each formed to support the body bolster, when turned to one position and to be free of this supporting relation when turned to an alternative position and each having engagement with the truck bolster to be turned thereby to functioning position when the bolsters are angular and each being weighted to be self-restoring to non-functioning position when the bolsters are parallel.

4. The combination with a car truck bolster; of a car body bolster; and oscillating rollers interposed between the bolsters and each formed to support the body bolster, when turned to one position and to be free of this supporting relation when turned to an alternative position and each having a lug engageable with the truck bolster to be turned thereby to functioning position when the bolsters are angular and each being weighted to be self-restoring to non-functioning position when the bolsters are parallel.

5. The combination with a car truck bolster; of a car body bolster; and oscillating rollers interposed between the bolsters and each having a rounded portion supporting the body bolster, when turned to one position and a flattened portion to be free of this supporting relation when turned to an alternating position and each having engagement with the truck bolster to be turned thereby to place its rounded portion uppermost when the bolsters are angular and each being weighted to place its flattened portion uppermost when the bolsters are parallel.

6. The combination with a car truck bolster; of a car body bolster; and oscillating rollers interposed between the bolsters and each having a rounded portion supporting the body bolster, when turned to one position and a flattened portion to be free of this supporting relation when turned to an alternating position and each having a lug engageable with the truck bolster to be turned thereby to place its rounded portion uppermost when the bolsters are angular and each being weighted to place its flattened portion uppermost when the bolsters are parallel.

In witness whereof, I hereunto subscribe my name this 8th day of December A. D., 1923.

HERMAN C. PRIEBE.